July 24, 1951 M. S. WHEELER 2,562,006
DIRECT CURRENT AMPLIFIER
Filed Aug. 21, 1947
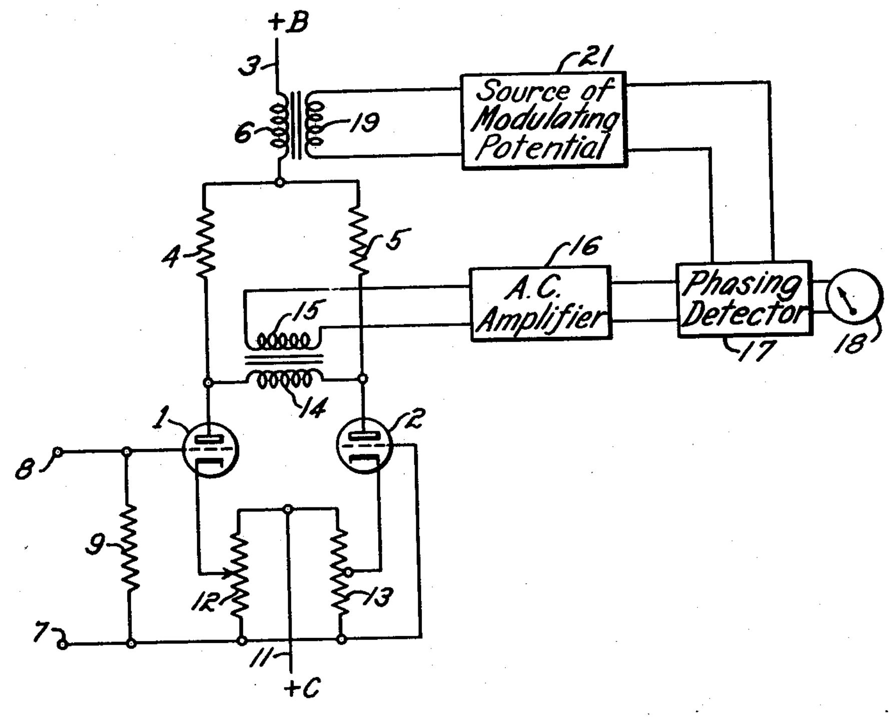
WITNESSES:
Wm. B. Sellers.
Nw. C. Groome
INVENTOR
Myron S. Wheeler.
BY
F. W. Lyle
ATTORNEY Patented July 24, 1951 2,562,006

UNITED STATES PATENT OFFICE 2,562,006

DIRECT-CURRENT AMPLIFIER

Myron S. Wheeler, Upper Montclair, N. J., assignor to Westinghouse Electric Corporation, East Pittsburgh, Pa., a corporation of Pennsylvania Application August 21, 1947, Serial No. 769,953

8 Claims. (Cl. 332—47)

My invention relates to amplifiers and, in particular, relates to arrangements by which a direct-current input voltage may be amplified through conversion of the direct-current to alternating-current which can be readily and accurately amplified by relatively inexpensive and reliable alternating-current amplifiers with subsequent reconversion of the amplified output to direct current.

The design of direct-current amplifiers has, in the prior art, been a source of major difficulty, inasmuch as it has been found necessary to employ grid potential and other voltage sources which are regulated to a high degree of constancy. Such regulation is in itself extremely difficult and expensive. Furthermore, even when such highly regulated voltage sources are employed, the variation with temperature and time of the electrical characteristics of the amplifier tubes which are employed has been another fruitful source of error and has made it necessary to resort to pushpull operation of amplifiers, temperature control of the housings in which the amplifiers are installed, and other costly and cumbersome expedients.

One object of my invention is, accordingly, to provide a materially simplified circuit for amplifying direct-current voltages in which extreme precision in the regulation of voltage sources employed to energize the amplifier tubes is unnecessary.

Another object of my invention is to provide a direct-current amplifier in which the effects of variation of the electrical characteristics of the amplifier tubes from time to time is avoided.

Another object of my invention is to provide a direct-current amplifier in which the major part of the amplification is carried out while the energy being amplified is in an alternating-current form.

Still another object of my invention is to provide a direct-current amplifier in which the major portion of the energy amplification is carried out by means of conventional alternating-current amplifiers which have been developed to a high degree of precision in the radio art and which have been rendered relatively inexpensive by widespread use.

Other objects of my invention will become apparent upon reading the following description, taken in connection with the drawing, in which the single figure is a schematic diagram of one circuit in which the principles of my invention may be embodied.

In accordance with one of the broad principles of my invention, I provide a pair of pushpull amplifier tubes which are plate modulated with an alternating-current frequency, and connect these tubes in a balanced bridge circuit with a suitable pair of resistors. I then impress the direct-current voltage to be amplified on the control grid of one of these tubes, thereby unbalancing the bridge, and producing an alternating-current output voltage due to this unbalance which I amplify through conventional alternating-current amplifiers of a type well known in the radio art. The desired amplification being thus accomplished, I impress the amplifier output on a phasing detector which compares the phase of the amplifier output with the phase of the modulation impressed on the plates of the initial pair of amplifier tubes above mentioned. When the direct-current voltage impressed on the control electrode of the first tube of the system above mentioned has a predetermined value, the output of the phasing detector is zero, but when the above-mentioned direct-current voltage is of any other value, the unbalanced voltage of the above-mentioned bridge system produces a direct-current output from the phasing detector which is impressed on a direct-current indicating instrument in the output thereof.

The above-mentioned general principles are embodied in the circuit shown in the drawing, in which 1 and 2 are conventional high-vacuum triodes which are preferably as nearly identical with each other as is feasible. Their anodes are, respectively, connected to the positive terminal 3 of a direct-current source through a pair of preferably identical resistors 4, 5 and one winding 6 of a transformer. The negative terminal of the source 3 is connected to one terminal 7 of an input circuit having another terminal 8 across which the voltage to be measured is impressed. A resistor 9 may shunt the input terminals 7, 8. The terminal 7 is likewise connected to the positive terminal of a direct-current bias source of which the negative terminal 11 is connected to the two ends of a pair of resistors 12, 13 having their other ends connected to the terminal 7. The cathode of the tube 1 is connected to a movable tap on the resistor 12 and its control electrode is connected to the input terminal 8. The cathode of tube 2 is connected to a fixed point, which may conveniently be the mid point, of the resistor 13, and its control electrode is connected directly to the input terminal 7. Between the anodes of the tubes 1 and 2 is connected the primary winding 14 of an alternating-current transformer having a secondary winding 15 connected to the input of a conventional alternating-current amplifier 16 designed to efficiently amplify alternating voltages having the frequency of a source 21 of modulating voltage about to be mentioned below. The output of the amplifier 16 is connected to one pair of input terminals of a phasing detector 17 having output terminals connected to a direct-current indicating instrument 18.

A second winding 19 in inductive relation with the winding 6 is connected to a source of modulating voltage 21 which may be of any conventional type suitable for generating frequencies which the amplifier 16 amplifies effectively. The source of modulating voltage 21 is likewise connected to impress its voltage on a second pair of input terminals on the phasing detector 17.

While I do not wish to be limited thereby, I believe the mode of operation of the above-described system to be substantially as follows. The tubes 1 and 2 have impressed on their main electrode circuits a modulating voltage through the action of the source 21, primary winding 19 and secondary winding 6. Current thus flows from the positive terminal 3 through the resistors 4 and 5 and the anode-to-cathode circuits of the tubes 1 and 2 and the lower portions of the resistor 12 and 13 which are below the tap points for the respective cathodes of the tubes 1 and 2. The variable tap on the resistor 12 is so positioned that when a predetermined direct-current voltage (which may be zero) is impressed on the input terminals 7 and 8, the alternating-current voltage impressed on the terminals of the winding 14 is zero. Such a setting for the variable tap on resistor 12 may, of course, be found because the alternating-current voltage across tube 1 may be made equal to the alternating-current voltage across tube 2, thereby bringing the lower terminals of resistors 4 and 5 to the same alternating-current potential. The current traversing the resistors 4 and 5 will be a pulsating direct current, having an alternating component of the frequency impressed by the modulating voltage source 21. Since the potential difference across the winding 14 is zero, the alternating voltage impressed on the input of amplifier 16 is correspondingly zero.

Now suppose a direct-current voltage is impressed on the input terminals 7, 8. The current flowing through the tube 1 will be changed in value while that flowing through the tube 2 will remain substantially unaltered. There will, accordingly, be a change in the dynamic plate resistance of tube 1 unbalancing the Wheatstone bridge with the result that a pulsating voltage difference is impressed across the terminals of the winding 14. Correspondingly, the secondary winding 15 will impress the alternating component of this pulsating voltage across the input of amplifier 16 and this will be amplified therein to impress an amplified output voltage of corresponding frequency on the input of phasing detector 17. In the phasing detector 17, this impressed voltage is compared with the output voltage of the modulating potential source 21.

It will be evident that if the current flowing through tube 1 is made less than that through tube 2, the voltage impressed across the terminals of transformer winding 14 is of one polarity, while if the current flowing through tube 1 is greater than that flowing through tube 2, the voltage across the terminals of transformer winding 14 is of the opposite polarity. It is thus evident that the voltage impressed on the input of phasing detector 17 changes substantially through 180 degrees when the direct-current voltage impressed across the input terminals 7, 8 changes from one side to the other of the predetermined value above mentioned at which the bridge comprising tubes 1 and 2 and resistors 12, 13 was initially balanced. Correspondingly, the output voltage of phasing detector 17 will change in polarity, thereby changing the direction of deflection of the needle on the indicating instrument 18.

While I have described a phasing detector 17 as used to indicate the magnitude of the output of amplifier 16, it will be evident to those skilled in the art that many other devices known in the art for measuring the output voltage of an alternating-current amplifier may be employed in place of the phasing detector 17 and instrument 18.

It will be noted that since the only tube which is impressed with a direct-current input voltage is the tube 1, the many difficulties which arise from the necessity of providing direct-current bias voltages of extreme constancy, which is characteristic of prior art arrangements in which the successive stages of the amplifier are called upon to amplify direct-current voltages, are avoided in my arrangement. It will likewise be noted that any changes in the voltage impressed on the plate circuit of the tubes 1 and 2, or the magnitude of the voltage impressed by the modulating potential source 21, or in the characteristics of the tubes 1 and 2 themselves, are substantially balanced out and produce no voltage across the terminals of the transformer winding 14 by the fact that the anode circuits of the tubes 1 and 2 are initially balanced against each other. In short, it is only changes in the system which differently affect the tubes 1 and 2 which produce a voltage at the input of the amplifier 16; and since it is possible to obtain tubes 1 and 2, and other circuit elements which have electrical characteristics which respond in the same way and amount to changes of current flow through them, the outbalancing of such undesired variations in the characteristics of the circuit elements is possible with my system.

I claim as my invention:

1. Means for deriving an alternating voltage, which corresponds in magnitude with a direct-current input voltage, which comprises a bridge circuit in which two adjacent arms are grid-controlled electrical discharge tubes and the other two arms are resistors, means for impressing a modulated voltage between the terminal of said bridge intervening between said tubes and the common terminal of said resistors, and means for deriving an alternating voltage between a pair of points lying respectively on the anode-to-cathode circuits of said tubes, means for maintaining the control grid of one of said tubes at a constant potential relative to the common terminal of said resistors and for impressing said direct-current input voltage between said common terminal of said resistors and the control grid of the other said tube.

2. Means for deriving an alternating voltage, which corresponds in magnitude with a direct-current input voltage, which comprises a bridge circuit in which two adjacent arms are grid-controlled electrical discharge tubes and the other two arms are resistors, means for impressing a modulated voltage between the terminal of said bridge intervening between said tubes and the common terminal of said resistors, and means for deriving an alternating voltage between a pair of points lying respectively on the anode-to-cathode circuits of said tubes, means for maintaining the control grid of one of said tubes at a constant potential relative to the common terminal of said resistors and for impressing said direct-current input voltage between said common terminal of said resistors and the control grid of the other said tube, and means for varying the resistance of the anode-to-cathode circuit of one of said tubes to make the potential difference between said pair of points zero when said input voltage has a predetermined value.

3. Means for deriving an alternating-current output voltage which corresponds with a direct-current input voltage comprising a bridge circuit in which each half consists of a first resistor in series with the anode of a grid-controlled electrical discharge tube and a second resistor in series with the cathode of said discharge tube, means for impressing a modulated voltage across one diagonal of said bridge to cause current to flow through said halves of said bridge circuit in multiple with each other, means for deriving a potential difference between the anodes of said tubes, means for connecting the control electrode of one of said tubes to the common terminal of said second resistors, and means for impressing said direct-current voltage between said common terminal of said second resistors and the control electrode of said other tube.

4. Means for deriving an alternating voltage, which corresponds in magnitude with a direct-current input voltage, which comprises a pair of grid-controlled electrical discharge tubes respectively connected in series with two resistors in opposite branches of a bridge circuit, means for impressing a voltage having an alternating component on the anode-cathode circuits of said tubes, means for maintaining the grid voltage of one of said tubes substantially constant while impressing said direct-current input voltage between the grid of said other tube and the common junction of said resistors in said bridge circuit, means for deriving a voltage from two points positioned respectively on the anode-cathode circuits of said tubes, and means for adjusting the magnitude of one of said resistors to make the potential difference between said points equal to zero at a predetermined value of said direct-current input voltage.

5. Means for deriving an alternating voltage, which corresponds in magnitude with a direct-current input voltage, which comprises a pair of grid-controlled electrical discharge tubes respectively connected in series with two resistors in opposite branches of a bridge circuit, means for impressing a voltage having an alternating component on the anode-cathode circuits of said tubes, means for maintaining the grid voltage of one of said tubes substantially constant while impressing said direct-current input voltage on the grid circuit of the other of said tubes, and means for deriving a voltage from two points positioned respectively on the anode-cathode circuits of said tubes.

6. Means for deriving an alternating voltage, which corresponds in magnitude with a direct-current input voltage, which comprises a pair of grid-controlled electrical discharge tubes respectively connected in series with two resistors in opposite branches of a bridge circuit, means for impressing a voltage having an alternating component on the anode-cathode circuits of said tubes, means for maintaining the grid voltage of one of said tubes substantially constant while impressing said direct-current input voltage on the grid circuit of the other said tubes, means for deriving a voltage from two points positioned respectively on the anode-cathode circuits of said tubes, and means for adjusting the resistance in series with one of said tubes to render the potential difference between said points zero when said direct-current input voltage has a predetermined magnitude.

7. Means for deriving an alternating voltage, which corresponds in magnitude with a direct-current input voltage, which comprises a pair of grid-controlled electrical discharge tubes respectively conected in series with two impedances in opposite branches of a bridge circuit, means for impressing a voltage having an alternating component on the anode-cathode circuits of said tubes, means for maintaining the grid voltage of one of said tubes substantially constant while impressing said direct-current input voltage between the grid of said other tube and the common junction of said impedances in said bridge circuit, means for deriving a voltage from two points positioned respectively on the anode-cathode circuits of said tubes, and means for adjusting the magnitude of one of said impedances to make the potential difference between said points equal to zero at a predetermined value of said direct-current input voltage.

8. Means for deriving an alternating-current output voltage which corresponds with a direct-current input voltage comprising a bridge circuit in which each half consists of a first impedance in series with the anode of a grid-controlled electrical discharge tube and a second impedance in series with the cathode of said discharge tube, means for impressing a modulated voltage across one diagonal of said bridge to cause current to flow through said halves of said bridge circuit in multiple with each other, means for deriving a potential difference between the anodes of said tubes, means for connecting the control electrode of one of said tubes to the common terminal of said second impedance, and means for impressing said direct-current voltage between said common terminal of said second impedances and the control electrode of said other tube.

MYRON S. WHEELER.

REFERENCES CITED

The following references are of record in the file of this patent:

UNITED STATES PATENTS

| Number | Name | Date |
|---|---|---|
| 1,428,156 | Espenschied | Sept. 5, 1922 |
| 1,664,455 | King | Apr. 3, 1928 |
| 2,297,543 | Eberhardt | Sept. 29, 1942 |
| 2,305,307 | Wellenstein et al. | Dec. 15, 1942 |